Sept. 25, 1962    J. D. WATTS    3,055,537
CLOSURE AND SEAL

Filed May 3, 1960    2 Sheets-Sheet 1

INVENTOR
JOHN D. WATTS

BY Cushman, Darby + Cushman
ATTORNEYS

Sept. 25, 1962 J. D. WATTS 3,055,537
CLOSURE AND SEAL
Filed May 3, 1960 2 Sheets-Sheet 2
*Fig. 3.*
*Fig. 4.*
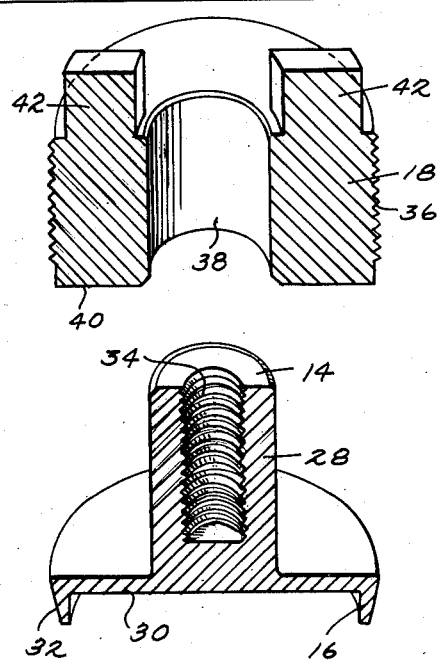
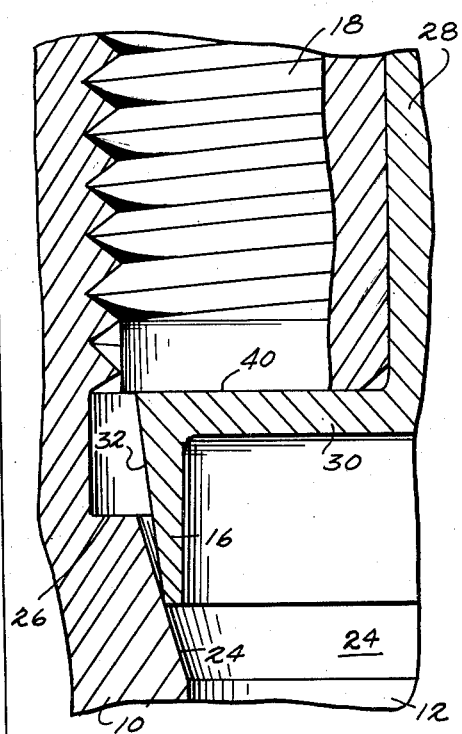
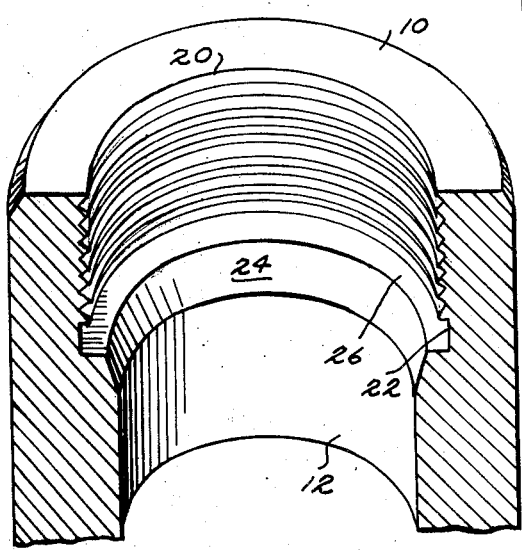
*Fig. 5.*
INVENTOR
JOHN D. WATTS
BY Cushman, Darby + Cushman
ATTORNEYS

United States Patent Office 3,055,537
Patented Sept. 25, 1962

3,055,537
CLOSURE AND SEAL
John D. Watts, Houston, Tex., assignor to Gray Tool Company, Houston, Tex., a corporation of Texas
Filed May 3, 1960, Ser. No. 26,457
1 Claim. (Cl. 220—46)

The present invention relates to removable closure means for sealing openings in high pressure apparatus, and more particularly to a novel, combined closure and seal construction adapted to effect in an opening in a pressure casing a fluid-tight seal capable of withstanding extremely high pressures and/or temperatures.

The invention disclosed herein is of the same general type as that disclosed in my copending application Serial Number 752,639, now Patent No. 3,021,974, granted February 20, 1962. In this copending application there is shown and described a closure and seal construction wherein there does not exist, at any time, relative movement between the sealing element and the seat against which it seals. Such a construction is ideally suited to applications wherein it is necessary to form both the sealing element and seat of materials having low galling resistance, such as, for example, stainless steel. The present invention, on the other hand, is concerned with a combined closure and seal construction wherein there does exist relative movement between the sealing element and its seat, primarily when the seal is effected. It is therefore contemplated that the present invention be utilized in environments where no galling problems exist, such as where the respective parts are formed of non-galling material, or where there is provided a suitable coating or lubricant on the respective seal members to prevent galling. Accordingly, the invention disclosed herein is predicated upon different sealing concepts than are disclosed in my copending application.

As will be more clearly set forth hereinafter, the closure means embodying the principles of the present invention is adapted to be utilized in any application where it is desired to close and seal an opening in a high pressure casing, or the like, to prevent the leakage of high pressure fluid in the casing through the opening. The casing may be a conduit, wherein it is desired to close and seal one end, or it may be a pressure vessel, wherein it is desired to close and seal an open end of the vessel. The invention is capable of application to both large and small openings, but has particular utility with respect to the sealing of large diameter openings.

As is well known in the art there are many problems which arise when it is desired to seal a relatively large diameter opening in a high pressure casing, or the like, such as those encountered in conventional oil well or chemical processing equipment. Threaded plugs alone, while satisfactory in some applications, are not satisfactory in applications where extremely high pressure is present, since in most instances fluid will begin to leak past the threads in a relatively short time. Similarly, seals requiring the use of gaskets or conventional compressible materials, such as rubber or the like, are often not effective in extremely high pressure and/or temperature applications, especially when the seal must remain effective for long periods of time without any maintenance. In addition, such seals are also subject to corrosion or other harmful effects due to the presence of chemicals or other liquids within the casing being sealed.

It is therefore a primary object of the present invention to provide removable closure means of unusual versatility which will effectively seal an opening in a high pressure casing, almost regardless of the size of the opening, against the leakage of high pressure fluid therethrough, which means is capable of withstanding extremely high pressures for an indefinite length of time.

It is another object of the present invention to provide closure means having a flexible sealing element adapted to achieve and maintain an effective seal by means of the stored energy within the sealing element resulting from its deflection when it is in sealing engagement, the deflection of the sealing element being within the elastic limit of the material of which it is made.

It is a further object of the present invention to provide closure means comprising sealing means capable of sealing relatively large diameter openings against extremely high pressures, and equally effective, without modification in design, for sealing against lower pressures, which sealing means creates a seal which may be effected by the application of only moderate force.

It is yet another object of the present invention to provide closure means of simple and inexpensive design which is adapted to be quickly and conveniently secured in place, or removed therefrom, and which does not require the use of gaskets, nor accurate pre-alignment before being securely fastened in place.

It is yet a further object of the present invention to provide closure means comprising a sealing means having a sealing element, the sealing element being completely protected by positive stop means so as to preclude the application of excessive force thereagainst which might damage or otherwise harm the seal, said sealing means being adapted for repeated usage without damage or loss of efficiency.

It is a further object of the present invention to provide a closure and seal construction in combination with the open end of a pressure casing, or the like, and involving a frsuto-conical sealed joint formed by a flexible sealing element and a corresponding sealing surface or seat adjacent the open end of a casing, wherein energy is stored in the sealing element in a unique manner to insure a completely fluid-tight seal.

These and other objects of the present invention will become apparent from consideration of the present specification taken in conjunction with the accompanying drawings in which there is shown a single embodiment of the invention by way of example, and wherein:

FIGURE 3 is a perspective exploded assembly view, in section, of the embodiment shown in FIGURE 1;

FIGURE 4 is an enlarged fragmentary sectional view of the closure and seal with the respective parts in assembled position but not yet drawn up tight; and FIGURE 5 is an enlarged fragmentary sectional view thereof after the seal has been effected.

Figure 1:
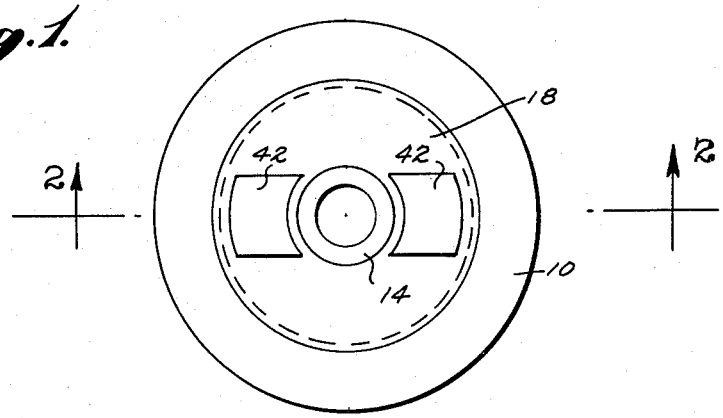
FIGURE 1 is a plan view of an exemplary embodiment of a closure and seal construction embodying the principles of the present invention.

Generally speaking, the present invention is concerned with closing and sealing an opening in a casing, such as, for example, the open end of a conduit or pipe, or an opening in a pressure vessel or the like. Basically, the exemplary embodiment illustrated and described herein comprises an open ended casing 10 having opening or bore 12, a sealing member 14 adapted to be held securely in a sealing position within the opening 12 and provided with a sealing element in the form of flexible sealing lip 16, and plug means 18 for removably but securely maintaining sealing member 14 in sealing engagement with casing 10.

More specifically, casing 10, only the end of which is shown, is of circular cross-sectional configuration, defining center bore or opening 12. As can be seen the terminal portion of opening 12 is provided with internal threads 20 which terminate within the casing 10 in an undercut portion 22. Inwardly of undercut portion 22 there is formed an inwardly tapering frusto-conical sealing surface 24, there being thus formed between the undercut portion 22 and sealing surface 24 a stop shoulder 26.

In order to effectively seal opening 12 of casing 10, there is provided sealing member 14. As can be seen, the sealing member 14 comprises a main cylindrical body portion 28, provided at its lower end with radially directed flange member 30 having disposed about its outer periphery an axially extending circumferential sealing element in the form of a flexible sealing lip 16. Formed about the outer circumferential surface of sealing lip 16 is a frusto-conical sealing surface 32, which is adapted to sealingly engage sealing surface or seat 24 on the casing, whereby there may be established a frusto-conical seal between the sealing member 14 and casing 10. For reasons as will be more fully described hereinafter, the sealing member 14 is also provided with a longitudinal threaded aperture 34.

Figure 2:
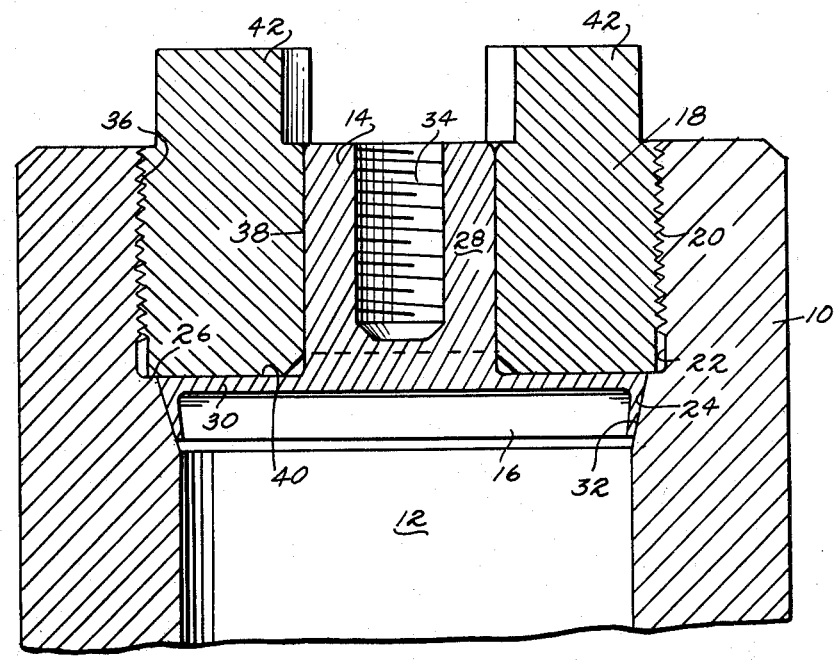
FIGURE 2 is a sectional view taken along line 2—2 of FIGURE 1.

Plug means 18, which serves to securely but removably hold the sealing member 14 in a sealing position, is provided with external threads 36 which are adapted to threadably engage threads 20 on the casing, and a central bore 38 which is adapted to slidably receive cylindrical body portion 28 of sealing member 14, as can be seen. The plug means 18 is also provided with a flat abutting surface 40 at the inner end thereof, and at the outer end there are provided a pair of oppositely disposed lugs 42 to facilitate easy assembly and removal of the plug means 18 from the casing 10. The closure means as described above is clearly illustrated in FIGURE 2, wherein the entire construction is shown in a fully assembly sealing relationship.

As will be appreciated, the inner surface of sealing member 14 will be subjected to the tremendous pressure which may exist within bore 12, and hence there will be a very large hydrostatic force tending to urge the sealing member out of sealing engagement. Accordingly, it is the function of plug means 18 to reinforce and hold in sealing position the sealing member 14 and particularly the outer face of flange member 30 by the forceful abutment thereagainst of inner surface 40 of the plug means 18, which abutment is effected by tightly screwing the plug means into the casing by means of lugs 42.

It is not contemplated that the engagement of threads 36 with threads 20 will in itself necessarily provide any kind of effective seal, it being intended that they serve primarily to securely hold the sealing member 14 in sealing engagement with the casing 10. Consequently, if desired, the plug means 18 may be removably secured to casing 10 by means of either a conventional bayonet type joint, a bolted flange, or any other similar conventional connection means. High pressure fluid will be prevented from leaking between the plug means and casing by the seal formed by the sealing engagement of sealing surfaces 24 and 32.

The present embodiment of a closure means is clearly illustrated in an exploded relationship in FIGURE 3. When it is desired to seal the open end of casing 10, it is necessary to first insert into the opening the sealing member 14, and then screw plug means 18 into the end of the casing until the assembly is brought up to a hand-tight position, as is clearly shown in FIGURE 4. The sealing member 14 is held in alignment and prevented from wedging within opening 12 by the reception of body portion 28 in bore 38 of the plug means. The relaxed configuration of the flexible sealing lip 16 is clearly illustrated in this figure. As can be seen, the angle of taper of the frusto-conical sealing surface 32 about the outer periphery of lip 16 is normally less than the angle of taper of the frusto-conical sealing surface 24 on casing 10. In addition, the diameter of the lower surface 40 of plug means 18 is greater than the external diameter of flange 30 and sealing lip 16.

Thus, when plug means 18 is tightly drawn into the casing 10, sealing member 14 will be urged axially inwardly and flexible sealing lip 16 will be deflected radially inwardly by the engagement thereof with sealing surface 24, to thereby effect a frusto-conical seal therewith. The engagement of the inner abutting surface 40 of plug means 18 with stop shoulder 26 on casing 10 serves to prevent overdeflection of the sealing lip 16. It is therefore possible to draw the plug means 18 up as tight as possible without risking damaging the seal, either by damaging one of the sealing surfaces or by overly deflecting the sealing lip by creating stresses within it greater than the elastic limit of the material of which it is formed.

FIGURE 5 clearly illustrates the closure structure in a fully assembled condition, wherein the frusto-conical seal has been effected. As can be seen, flexible sealing lip 16 has been deflected radially inwardly and is tightly urged and maintained in sealing engagement against sealing surface 24 by virtue of the internal energy created in it by its deflection. The engagement of surface 40 of plug means 18 with shoulder 26 of casing 10 is also very clearly shown, and, as discussed above, serves to prevent damage to the seal due to the over-application of force when screwing in and tightening plug means 18. It should be noted that the entire upper surface of flange member 30 is in continuous contact with surface 40 of plug means 18, so that it is prevented from bending or buckling. It is only the sealing lip 16 which is deflected.

It is contemplated that the closure construction herein described be formed of any suitable material having sufficient strength to withstand the pressures to be maintained, and having adequate corrosion resistance to withstand the corrosive effects of any fluid which may be handled. In addition, it is preferable that anti-galling materials be used so that the rubbing which occurs between sealing surface 32 and the flexible sealing lip 16, when the seal is effected, will not gall either of the sealing surfaces and thus render the resulting seal less efficient. There are commercially available many metal alloys suitable for application to the present closure and seal construction, however, certain metal alloys, such as, for example, stainless steel, while having sufficient strength and corrosion resistance, do not possess adequate anti-galling characteristics. It is therefore contemplated that when such materials as stainless steel are utilized the sealing surfaces will be coated with a suitable anti-galling composition to prevent any injury to the sealing surfaces when the seal is effected or assembled. One such anti-galling composition which is particularly suited for preventing galling between stainless steel is molybdenum disulphide, such as that commercially available under the trademark Techlube, supplied by Product Techniques and having a trade designation PT-17. As will be appreciated, only the sealing surfaces 24 and 32 need be coated, if coating is required, since undesirable rubbing occurs exclusively between these two surfaces when a seal is effected.

In the embodiment illustrated, the plug means 18 is formed separately from sealing member 14, the primary purpose of this two-piece construction being to minimize the rubbing contact of the two sealing surfaces. Thus, when a separate plug means is utilized the greatest proportion of the sliding between the two sealing surfaces is in an axial direction since the rotation of the plug means to screw it into and out of the casing is not directly communicated to the sealing member. However, if desired, the plug means 18 and sealing member 14 may alternately be formed as a single unitary member. As will be apparent, such a modification would function in exactly the same manner as does the illustrated embodiment, both with respect to method of assembly, and the resulting seal which is effected. About the only difference in such a modification would be that the sealing lip 16 would necessarily rotate with the plug means 18 when it is screwed into and out of position, and hence there would also be rubbing of the sealing surfaces in a circumferential, as well as axial, direction. This rubbing, however, will not diminish the efficiency of the seal if anti-galling materials are used, or if an anti-galling composition is coated on the sealing surfaces.

As is apparent, the present closure and seal construction is readily adapted to convenient disassembly and subsequent reuse, unlike many conventional high pressure seals which may not be reused a second time but which must be replaced. Thus, in the embodiment illustrated, disassembly is effected by unscrewing and removing plug means 18, as by means of lugs 42. Since, even with the plug means removed, the sealing member 14 will be tightly maintained in sealing engagement by the internal energy within the sealing lip 16, it is contemplated that a conventional plug or wheel puller be utilized to remove the sealing member. For this purpose threaded aperture 34 is provided for receiving the threaded stud on the puller device, as will be understood by those skilled in the art.

Thus, there is disclosed in the above description and in the drawings, an exemplary embodiment of my invention which fully and effectively accomplishes the objects thereof. The closure means disclosed herein comprises means on a casing defining a first frusto-conical sealing surface around the opening therein to be sealed, sealing means adapted to be tightly secured in the opening, means on said sealing means defining a second-frusto-conical sealing surface, the angle of taper of one of said sealing surfaces being normally less than the angle of taper of the other of said sealing surfaces, and means for removably securing the sealing means tightly in the opening, whereby one of said sealing surfaces engages the other sealing surface and is thereby deflected to mate therewith to seal the opening. Once the frusto-conical seal has been effected, it is tightly maintained by the internal energy thus created within the means defining the deflected sealing surface.

As will be understood by those skilled in the art, the specific details of construction and arrangement of parts, as described, are by way of example only and are not to be construed as limiting the scope of the invention. For example, it is contemplated that it would be fully within the scope of the present invention to simply invert the respective positions of the sealing lip and the corresponding sealing surface adapted to mate therewith. In such a modification a flexible sealing lip would be secured to the casing itself around the opening therein, not on a separate member, and the plug means, or an equivalent to the present sealing member, would be provided with a non-deflectable sealing surface adapted to sealingly mate with the sealing surface on the flexible lip. I, therefore, do not wish to be limited to the precise details set forth, and intend that the invention embody all such features and modifications as are within the scope of the appended claim.

Having thus described my invention, what I claim as new and desire to secure by Letters Patent is:

In a pressure vessel having an opening therein, a frustro-conical sealing surface on the wall of said vessel adjacent said opening; a removable sealing member for free reception in said opening, said sealing member including a rigid main body portion operative to bridge said opening to seal the latter and an axially extending, circumferential flexible lip integral therewith, said flexible lip having a cooperative sealing surface with an angle of taper normally less than the angle of taper of said vessel sealing surface but upon longitudinal movement toward said vessel sealing surface, said flexible lip being transversely deflectable into stressed sealing engagement therewith to provide a tight seal between the adjacent sealing surfaces whereby fluid is confined within said vessel about said seal and said main body portion; plug means for tightly securing said sealing member in said opening, and a positive stop shoulder in said vessel cooperatively positioned radially outward of the outer end of said vessel sealing surface operative to engage the inner end of said plug means to thereby limit axially inward movement of said sealing member whereby damage to said flexible lip sealing surface is prevented, said vessel being integrally threaded adjacent said stop shoulder, and said plug means being cooperatively threaded for engagement with said vessel threads.

References Cited in the file of this patent

UNITED STATES PATENTS

| | | |
|---|---|---|
| 2,016,227 | Clausen | Oct. 1, 1935 |
| 2,016,233 | Bowers | Oct. 1, 1935 |
| 2,641,381 | Bertrand | June 9, 1953 |

FOREIGN PATENTS

| | | |
|---|---|---|
| 659,287 | Great Britain | Oct. 17, 1951 |